(12) United States Patent
Wang et al.

(10) Patent No.: US 10,686,265 B2
(45) Date of Patent: Jun. 16, 2020

(54) TERMINAL STAND

(71) Applicant: P-TWO INDUSTRIES INC., Taoyuan (TW)

(72) Inventors: Chien-Chun Wang, Taoyuan (TW); Wen-Lun Wang, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 0 days.

(21) Appl. No.: 16/270,445

(22) Filed: Feb. 7, 2019

(65) Prior Publication Data

US 2019/0334260 A1 Oct. 31, 2019

(51) Int. Cl.
| | |
|---|---|
| *H01R 4/48* | (2006.01) |
| *H01R 9/22* | (2006.01) |
| *H01R 9/24* | (2006.01) |
| *H02G 15/06* | (2006.01) |
| *H01H 13/803* | (2006.01) |

(52) U.S. Cl.
CPC ............ *H01R 9/223* (2013.01); *H01H 13/803* (2013.01); *H01R 4/4818* (2013.01); *H01R 9/2416* (2013.01); *H02G 15/06* (2013.01); *H01H 2225/012* (2013.01)

(58) Field of Classification Search
CPC .... H01R 4/4818; H01R 13/70; H01R 13/713; H01R 13/641; H01H 2225/012; H01H 2003/146; H01H 13/803
See application file for complete search history.

(56) References Cited

U.S. PATENT DOCUMENTS

| | | | | |
|---|---|---|---|---|
| 3,142,741 A | * | 7/1964 | Bury ..................... | H01H 9/06 200/454 |
| 4,768,976 A | * | 9/1988 | Gelati ................. | H01R 4/4818 439/441 |
| 7,544,103 B2 | * | 6/2009 | Walter ................ | H01R 4/4836 439/441 |
| 7,614,922 B1 | * | 11/2009 | Buse ................... | H01R 4/4818 439/439 |
| 8,251,738 B2 | * | 8/2012 | Heckert .............. | H01R 4/4836 439/441 |
| 8,794,994 B2 | * | 8/2014 | Kollmann ........... | H01R 4/4836 439/441 |
| 9,343,828 B2 | * | 5/2016 | Bishop ................ | H01R 4/4818 |

* cited by examiner

*Primary Examiner* — Felix O Figueroa
(74) *Attorney, Agent, or Firm* — Sinorica, LLC (57) ABSTRACT

A terminal stand is provided. The terminal stand includes a base body, a movable part, a metal elastic part, a first signal element and a second signal element. One end of the metal elastic member includes two first abutments. The first signal element is disposed in a second receiving slot. One end of the first signal element includes a first contact portion and a second abutment. The second signal element is disposed in the second receiving slot. One end of the second signal element includes a second contact portion. The second contact portion contacts with the first contact portion and makes a signal circuit. When the movable member is pressed, the movable member drives the two first abutments to move, and the abutment drives the second abutment to move, with the first contact portion leaving the second contact portion, and the signal circuit is in an off-state state.

6 Claims, 14 Drawing Sheets

TERMINAL STAND

FIELD OF THE INVENTION

The present invention relates to a type of terminal stand, particularly, to a unique type with a movable part that can be pressed to push down a metal elastic part. This increases the accommodating space of a conducting wire to enter from a passage bore and to go deeper into the space vacated after the elastic part is pressed down. After the movable part is released, the metal elastic part lifts up and clamps the conducting wire, and an abutment of the movable part abuts a second abutment of a first signal element to make the first contact portion leave a second contact portion of the second signal element to form an off-state that indicates the conducting wire has been inserted into the terminal stand of the terminal stand.

BACKGROUND OF THE INVENTION

In general, the electrical connection between common electronic components are mostly done by the conducting wires, wherein the conventional connection method is to solder the conducting wires to the electronic components, or screw-lock them which are inconvenient to install. On the other hand, the problem of whether the conducting wires are connected to a substrate needs to be checked one by one which is another inconvenience through the conventional mounting method.

Therefore, the present invention has been made to efficiently install the conducting wire and confirm that it is mounted, and to propose a connection method or a device that can solve the above problem.

SUMMARY OF THE INVENTION

In view of the above-mentioned problems, the objective of the present invention is to provide a terminal stand for solving the problems faced by the prior art.

Based on the above objective, the present invention provides the terminal stand for the conducting wires, and the terminal stand includes a base body, the movable part, the metal elastic part, the first signal element, and a second signal element. The base body contains a housing and a side cover. The housing has a first receiving slot and the second receiving slot. The first receiving slot forming a first opening on one side of the housing, the second receiving slot forming a second opening on the side of the housing and forming a third opening on one end of the housing. The other side of the housing has a first through hole, the bottom surface of the housing has three pin holes, and the other end of the housing has the passage bore used for being passed through by the conducting wire, and the passage bore communicates with the first receiving slot; The side cover connected to the side of the housing and covers the first opening and the second opening, and the side cover has a second hole corresponding to the first through hole. One end of the movable part is a pressing end, the inner side of the pressing end has an abutment, and the other end of the movable part extends to form two arms, wherein one arm is coupled to the outer side of the first through hole, the other arm is coupled to the side cover, and the inner side of the two arms respectively correspond to the first through hole and a second through hole form an abutment slot. The metal elastic part is disposed in the first receiving slot, one end of the metal elastic part has two first abutments, wherein the first abutment passes through the first through hole and abuts against one of the abutment slot, the other first abutment passes through the second through hole and abuts against the other abutment slot, and the other end of the metal elastic part has a first pin, and the first pin passes through one of the corresponding the pin holes. A first signal element is disposed in the second receiving slot, one end of the first signal elements has the first contact portion, adjacent to the first contact portion has the second abutment and is partially protruding beyond the third opening, one end of the first signal element has a second pin, and the second pin passes through one of the corresponding the pin holes. The second signal element is disposed in the second receiving slot, one end of the second signal element has the second contact portion, the other end of the second signal element has a third pin, and the third pin passes through one of the corresponding the pin hole. When the movable part is rotationally displaced by an external force in the direction of the pin hole, the first abutment of the metal elastic part is driven by two abutment slots to be displaced in the direction of the pin hole, and the first contact portion contacts the second contact portion in order to form a signal loop at on-state. When the abutment abuts the second abutment portion and the second abutment portion is displaced toward the passage bore, the first contact portion is driven away from the second contact portion by the second contact portion, and the signal loop is in an off-state state.

Preferably, the side of the housing may have a plurality of engagement part, and the side cover has a plurality of engagement holes corresponding to the plurality of engagement parts.

Preferably, the other side of the housing may have a shaft hole, the side cover with another shaft hole, and the two arms have two shaft holes corresponding to the axis portion.

Preferably, the two sides of the housing are respectively extended to form extension parts near the top ends, and the two arms respectively abut the corresponding extension parts.

Preferably, the terminal stand can be disposed on the substrate, and the first pin, second pin and a third pin are inserted on the substrate.

Preferably, the first receiving slot may have a notch, a gap or a convex portion corresponding to one side of the top end of the base body.

The present invention is a type of terminal stand, a unique type with the movable part that can be pressed to push down the metal elastic part. This increases the accommodating space of the conducting wire to enter from the passage bore and then to go deeper into the space vacated after the elastic part is pressed down. After the movable part is released, the metal elastic part lifts up and clamps the conducting wire, and the abutment of the movable part abuts the second abutment of the first signal element to make the first contact portion leave the second contact portion of the second signal element to form an off-state that indicates the conducting wire has been inserted into the terminal stand of the terminal stand.

DETAILED DESCRIPTION OF THE PREFERRED EMBODIMENTS

To understand the features, contents, and advantages of the present invention and the effects thereof, the present invention will be described in conjunction with the drawings, and the embodiments of the present invention are described in detail below. The subject matter is only for illustration and description purposes. It is not intended to be a true proportion and precise configuration of the implementation of the present invention. Therefore, the scope of the present invention should not be construed and limit the scope of the present invention.

The advantages, features, and technical methods of the present invention will be more readily understood by referring to the exemplary embodiments and the accompanying drawings, and the present invention may be implemented in various forms. Therefore, it should not be construed as being limited to the embodiments set forth herein. Rather for those skilled in the art, the embodiments provided will provide a more thorough, comprehensive and complete disclosure of the scope of the present invention and the invention will be defined by the scope of the appended claims.

Figure 1:
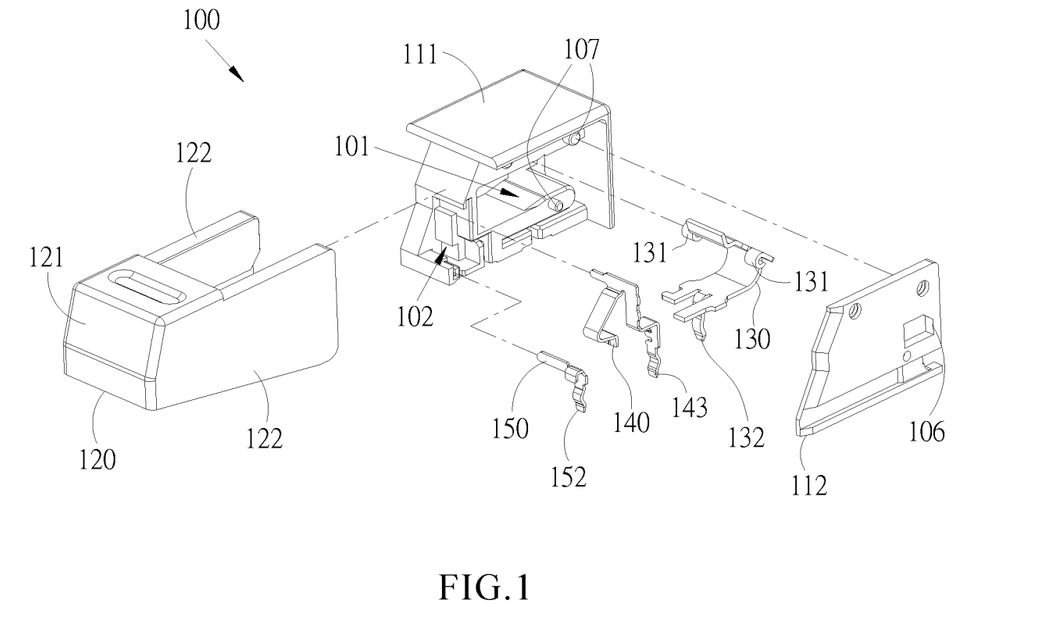
FIG. 1 is an exploded view of the terminal stand of the present invention.
Figure 2:
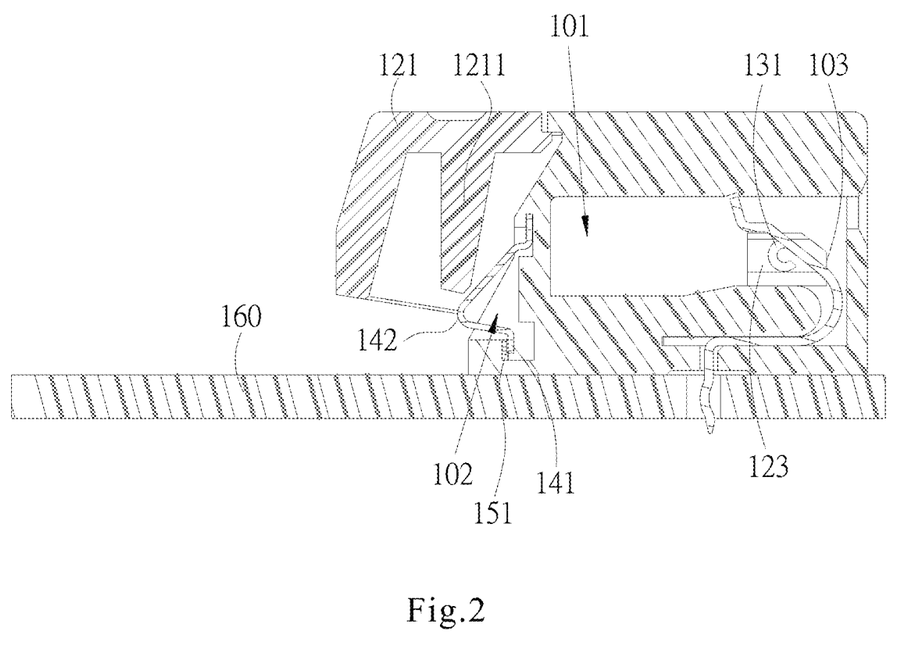
FIG. 2 is the first cross-sectional view of the terminal stand of the present invention.
Figure 3:
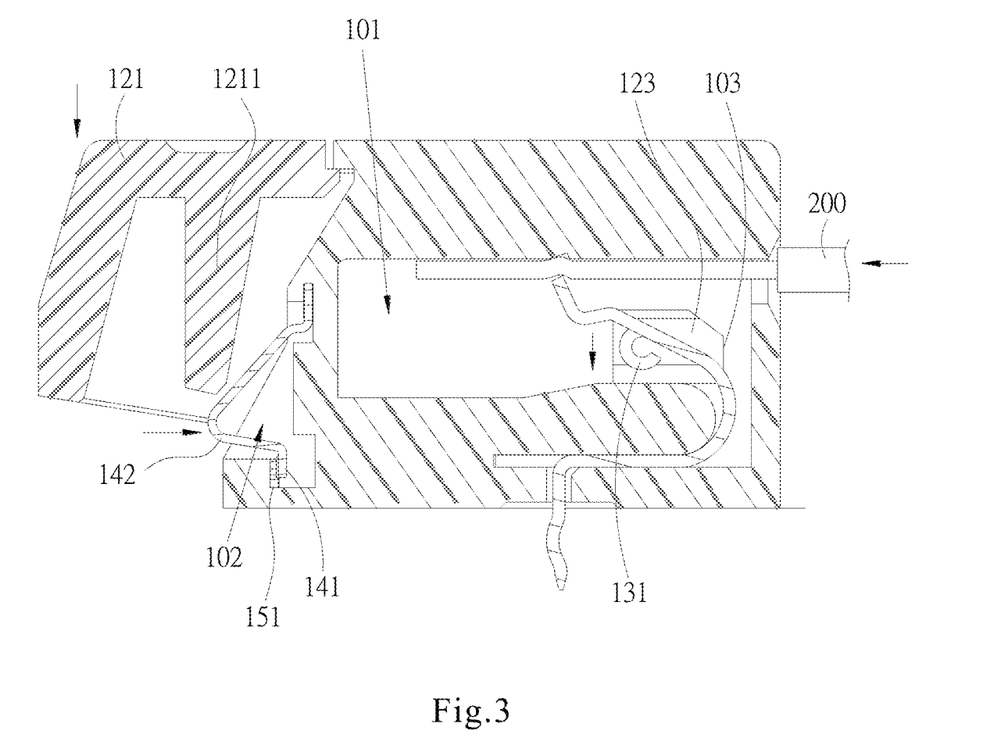
FIG. 3 is the second cross-sectional view of the terminal stand of the present invention.
Figure 4:
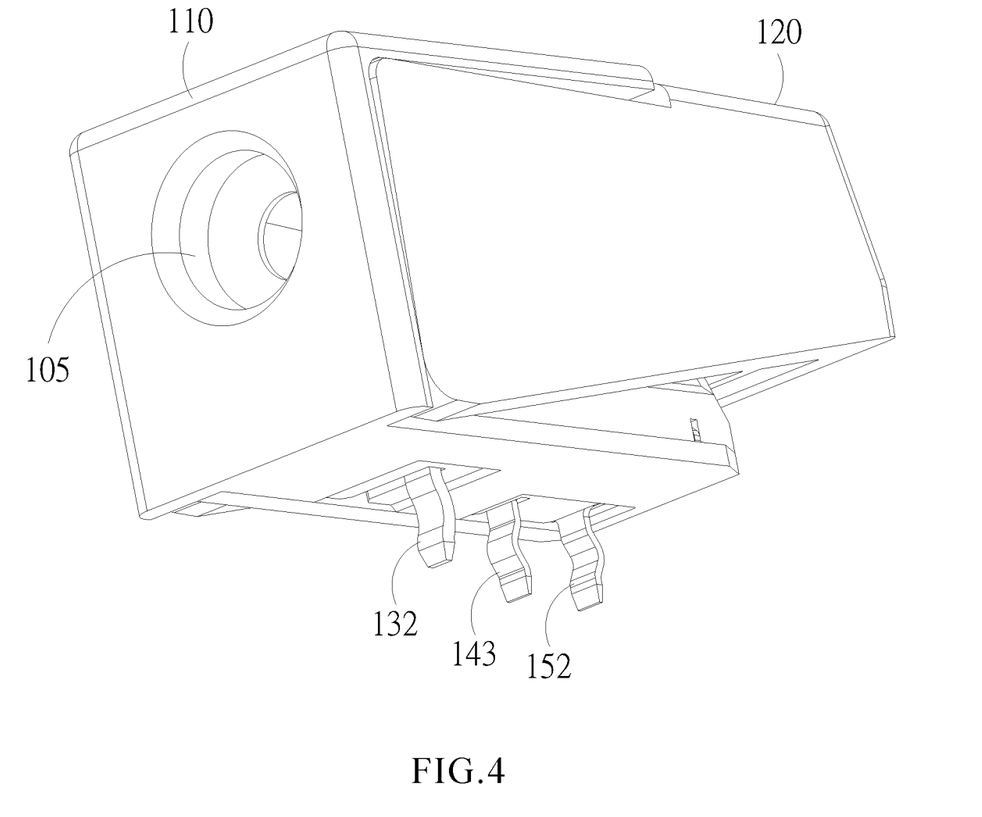
FIG. 4 is the first schematic view of the terminal stand of the present invention.
Figure 5:
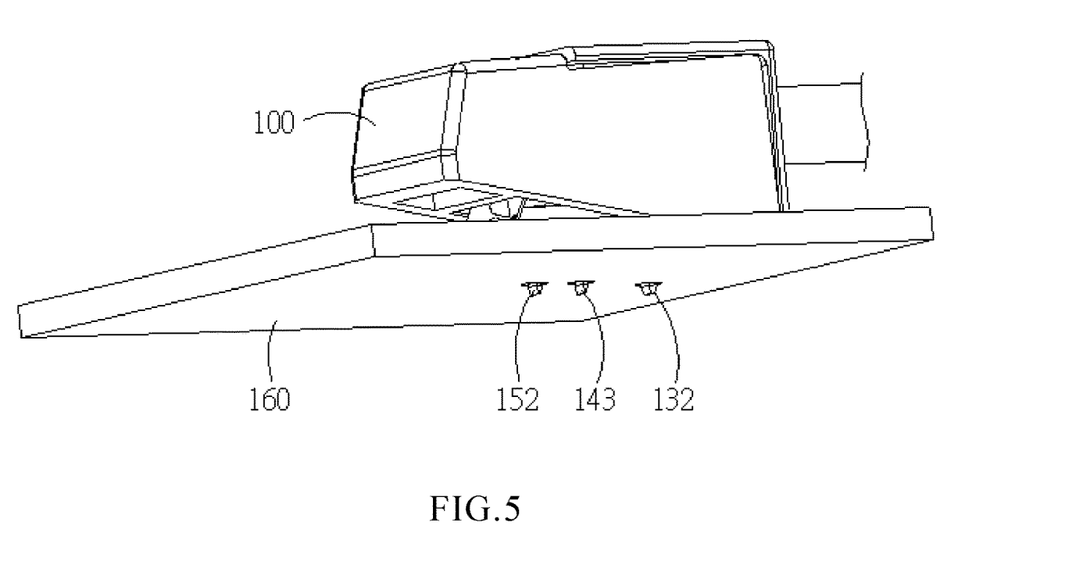
FIG. 5 is the second schematic view of the terminal stand of the present invention.
Figure 6:
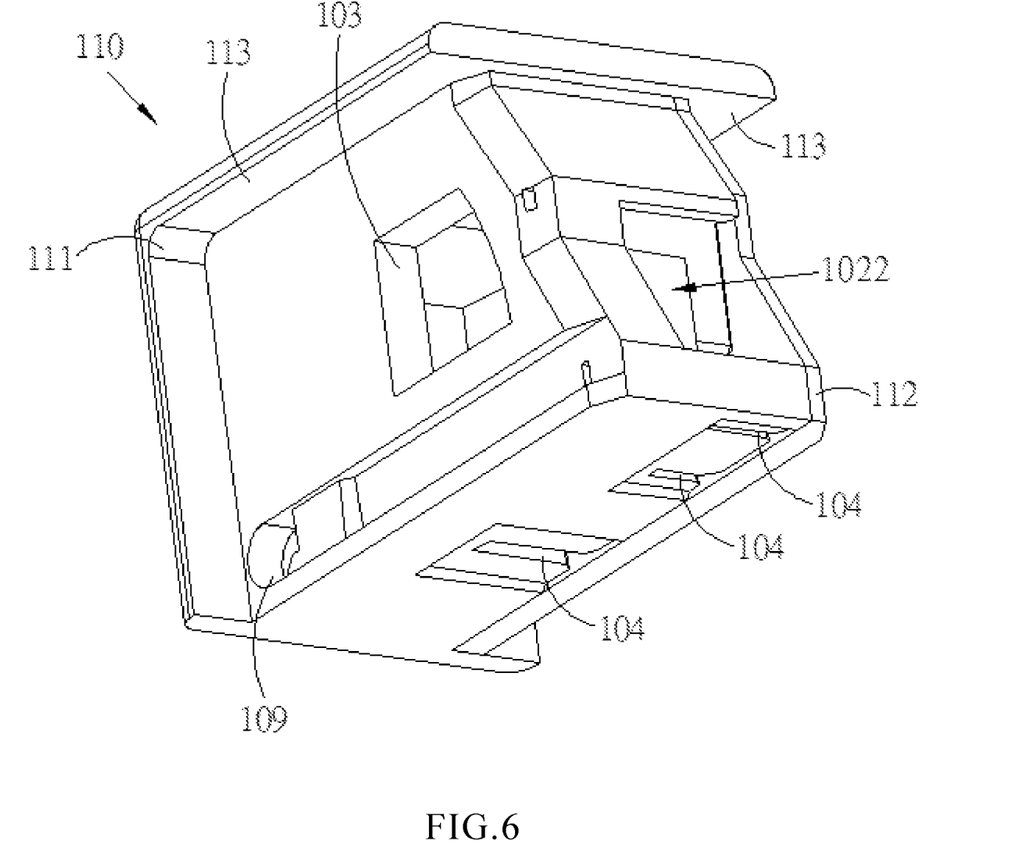
FIG. 6 is the first schematic view of the base body of the terminal stand of the present invention.
Figure 7:
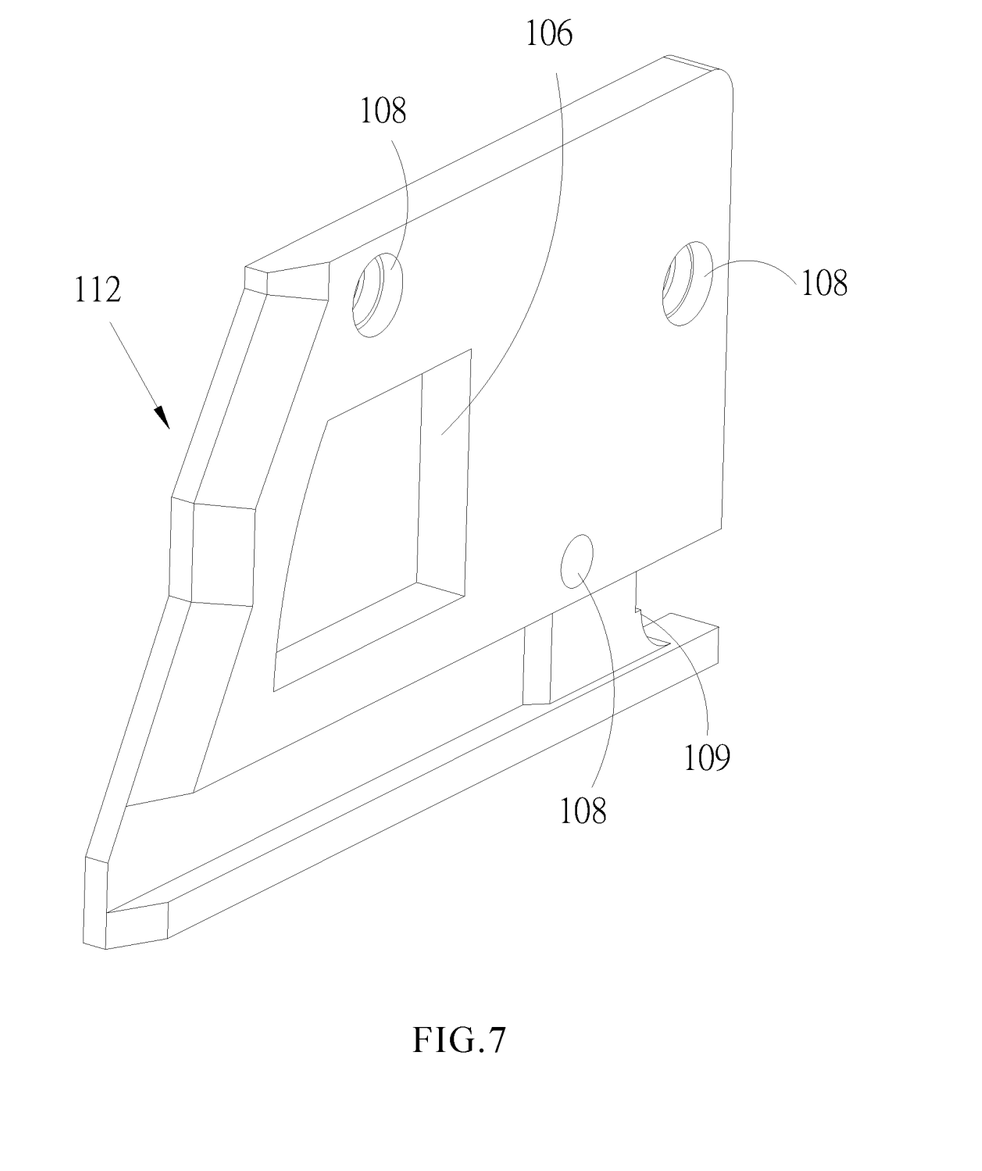
FIG. 7 is a schematic view of the side cover of the terminal stand of the present invention.
Figure 8:
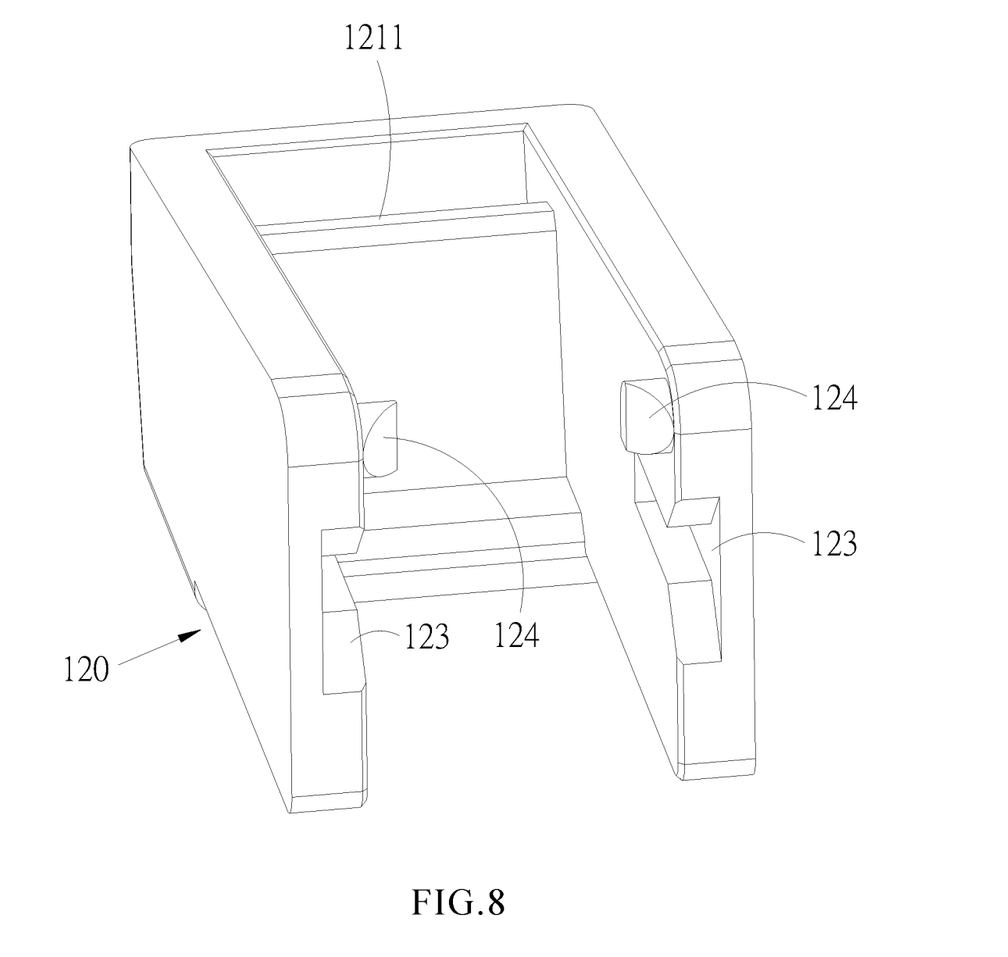
FIG. 8 is a schematic view of the movable part of the terminal stand of the present invention.
Figure 9:
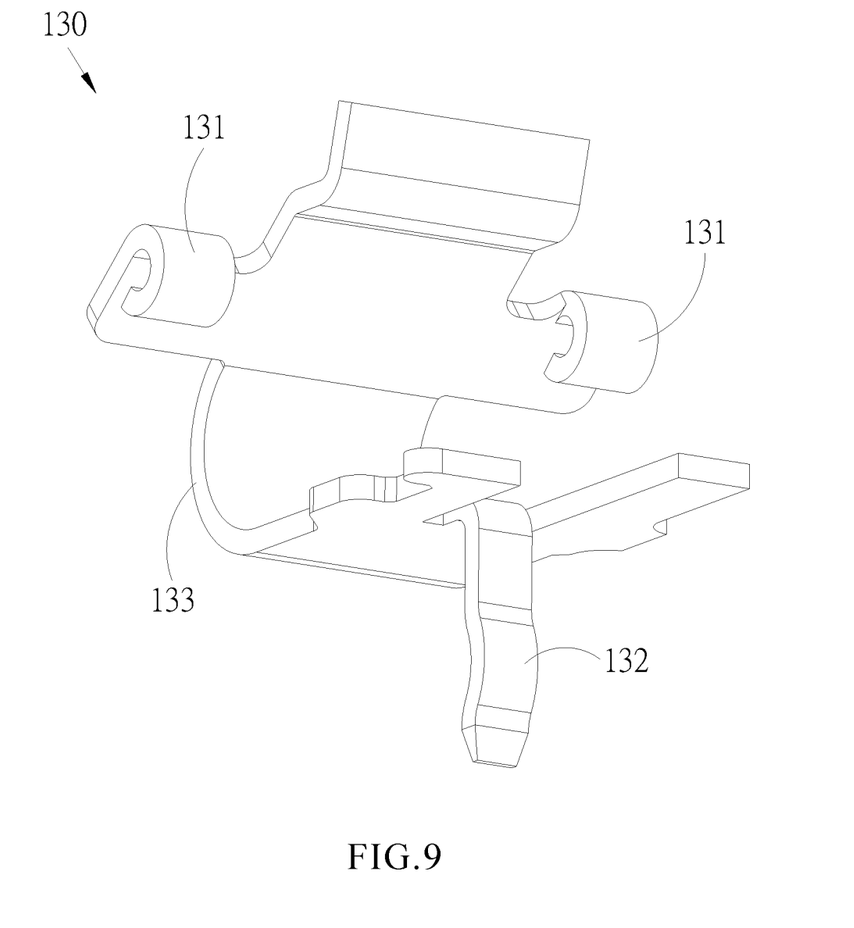
FIG. 9 is a schematic view of the metal elastic part of the terminal stand of the present invention.
Figure 10:
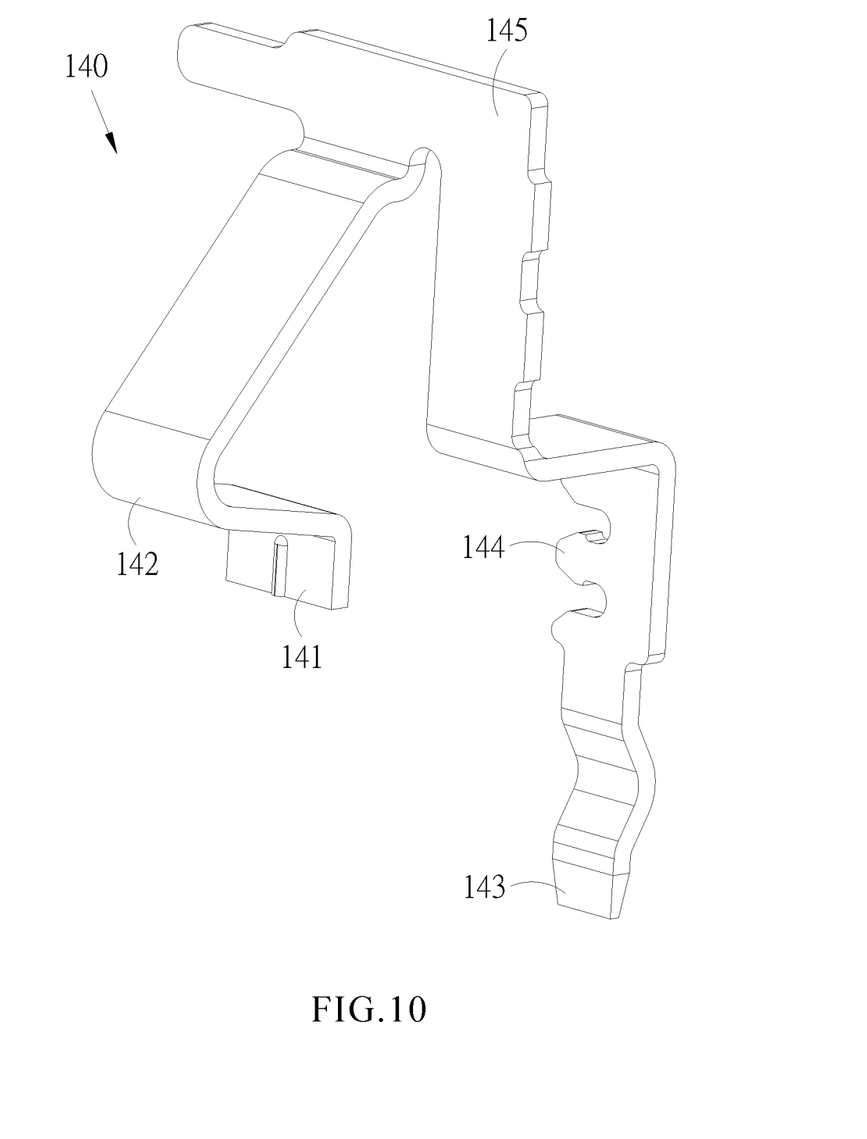
FIG. 10 is a schematic view of a first signal element of the terminal stand of the present invention.
Figure 11:
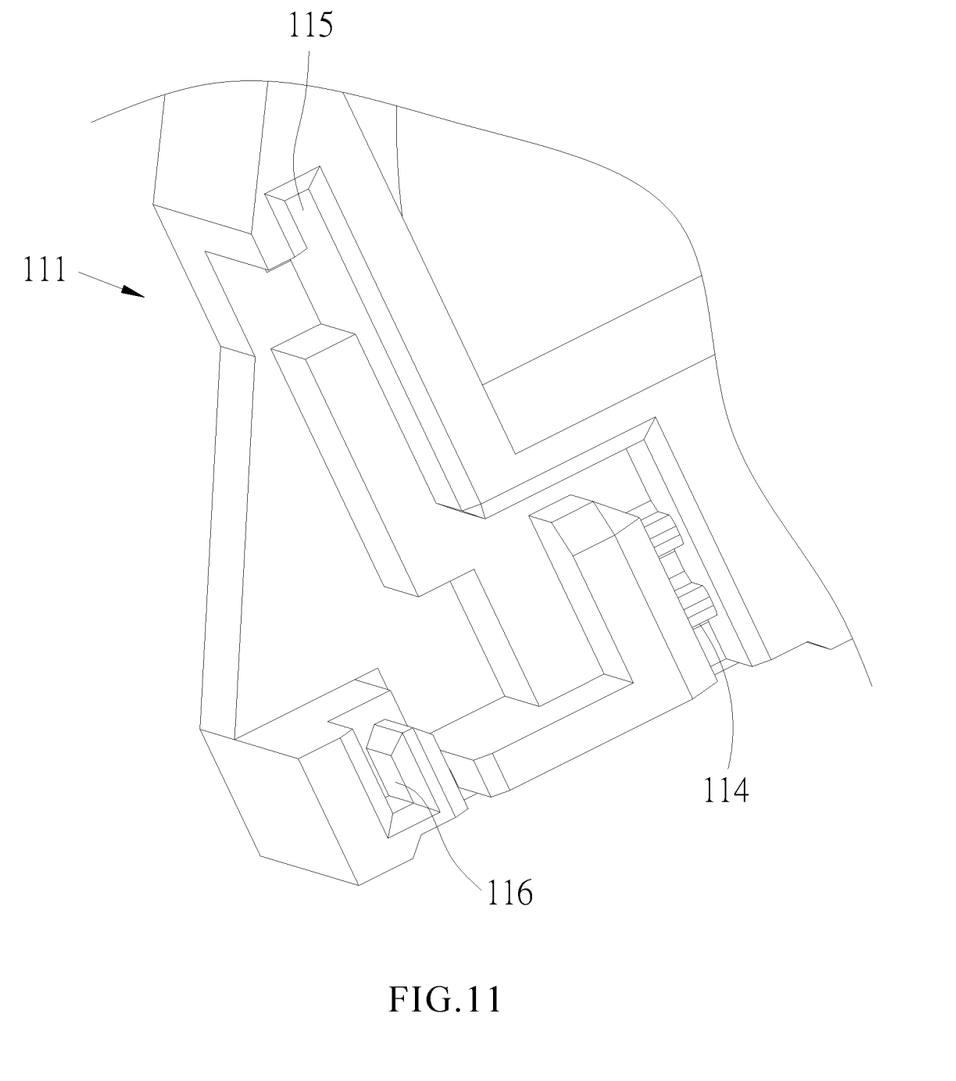
FIG. 11 is a partial schematic view of the housing of the terminal stand of the present invention.
Figure 12:
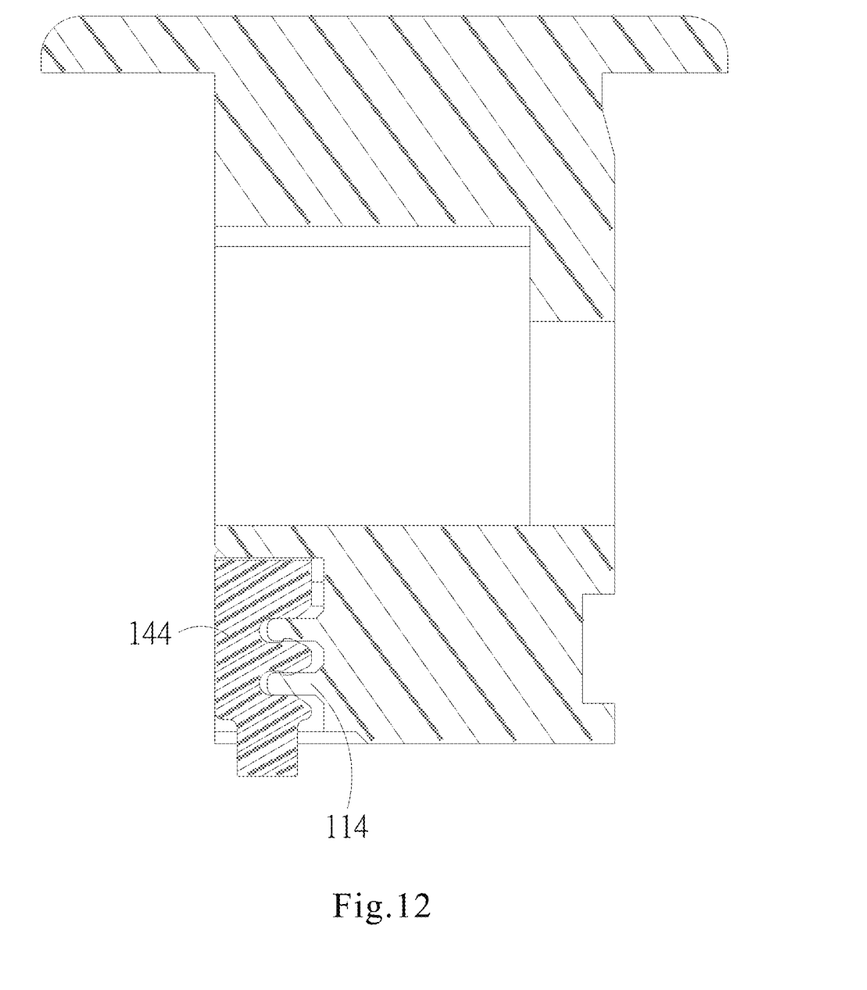
FIG. 12 is a cross-sectional view of the housing and the first signal element of the terminal stand of the present invention.
Figure 13:
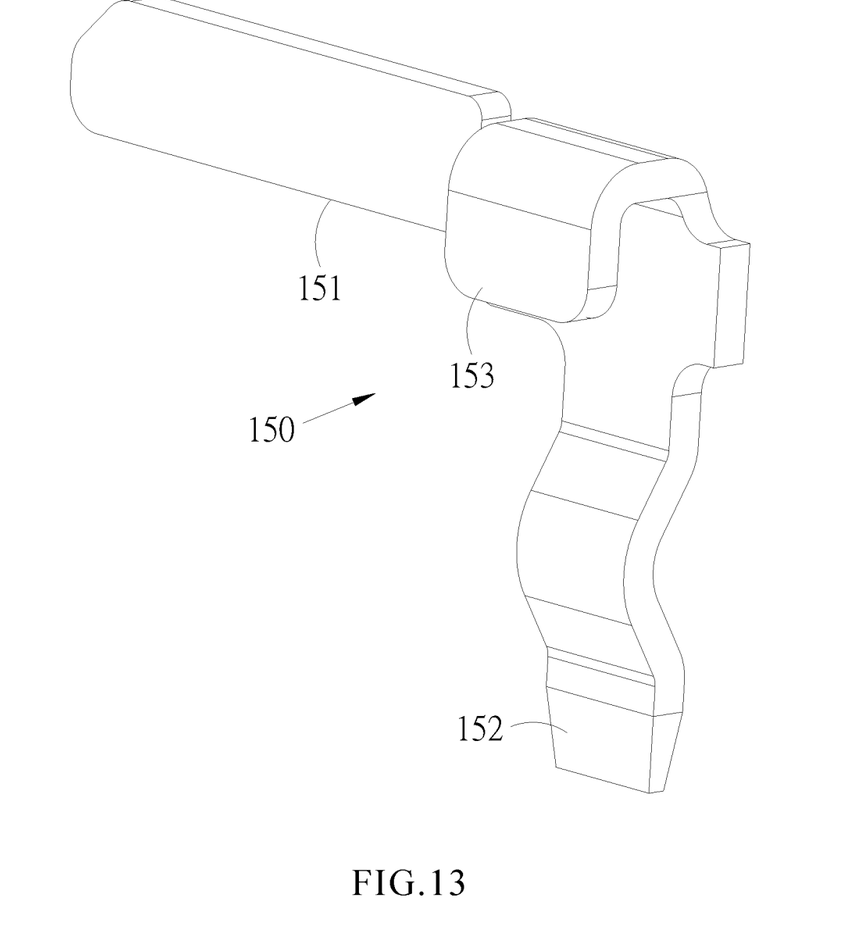
FIG. 13 is a schematic view of the second signal element of the terminal stand of the present invention.

Please refer to FIGS. 1 to 13; FIG. 1 is an exploded view of the terminal stand of the present invention; FIG. 2 is the first cross-sectional view of the terminal stand of the present invention; FIG. 3 is the second cross-sectional view of the terminal stand of the present invention; FIG. 4 is the first schematic view of the terminal stand of the present invention; FIG. 5 is the second schematic view of the terminal stand of the present invention; FIG. 6 is the first schematic view of the base body of the terminal stand of the present invention; FIG. 7 is a schematic view of the side cover of the terminal stand of the present invention; FIG. 8 is a schematic view of the movable part of the terminal stand of the present invention; FIG. 9 is a schematic view of the metal elastic part of the terminal stand of the present invention; FIG. 10 is a schematic view of the first signal element of the terminal stand of the present invention; FIG. 11 is a partial schematic view of the housing of the terminal stand of the present invention; FIG. 12 is a cross-sectional view of the housing and the first signal element of the terminal stand of the present invention; FIG. 13 is a schematic view of the second signal element of the terminal stand of the present invention. As shown in the figures, terminal stand 100 of the present invention is used to connect to a conducting wire 200, and the terminal stand 100 includes the base body 110, a movable part 120, a metal elastic part 130, a first signal element 140, and a second signal element 150. The metal elastic part 130, the first signal element 140 and the second signal element 150 are disposed in the base body 110, and the movable part 120 is movably displaced reciprocally relative to the base body 110.

Continuing, the base body 110 includes a housing 111 and a side cover 112; the housing 111 has a first receiving slot 101 and a second receiving slot 102. The first receiving slot 101 forms a first opening 1011 on one side of the housing 111 and the second receiving slot 102 forms a second opening 1021 on the side of the housing 111 and a third opening 1022 on one end of the housing 111. The other side of the housing 111 has a first through hole 103, and the bottom surface of the housing has three-pin hole 104. The other end of the housing has a passage bore 105 used for being passed through by the conducting wire 200, the passage bore 105 is in communicated with the first receiving slot 101.

The side cover 112 is connected to the side of the housing 111 and covers the first opening 1011 and the second opening 1021. The side cover 112 has a second through hole 106 corresponding to the first through hole 103.

One end of the movable part 120 is a pressing end 121, the inner side of the pressing end 121 has an abutment 1211, and the other end of the movable part 120 extends to form two arms 122, wherein one of the arms 122 is coupled to the housing 111 and has the other side of the first through hole 103. Another arm 122 is coupled to the side cover 112, and the inner side of two arms 122 respectively corresponds to the first through hole 103 and the second through hole 106 to form an abutment slot 123.

The metal elastic part 130 is disposed in the first receiving slot 101, and one end of the metal elastic part 130 has two first abutments 131, wherein the first abutment 131 passes through the first through hole 103 and abuts against one of the abutment slot 123, the other first abutment 131 passes through the second through hole 106 and abuts against the other abutment slot 123. The other end of the metal elastic part 130 has a first pin 132, and the first pin 132 passes through one of the corresponding the pin holes 104. The metal elastic part 130 has a bent portion 133, and both ends of the bent portion respectively extends and each end forms two first abutments 131 on one end and the other end with the first pin 132.

The first signal element 140 is disposed in the second receiving slot 102, while the one end of the first signal element 140 has a first contact portion 141, and the first contact portion 141 has a second abutment 142 with a portion of the second abutment 142 protrude through the third opening 1022. The other end of the first signal element 140 has a second pin 143, and the second pin 143 passes through the corresponding the pin holes 104. Wherein, the area in the first signal element 140 adjacent to the second pin 143 is corresponding to a second joint part 114 of the pin hole 104 which corresponds to the area in the second receiving slot 102 of the housing 111 adjacent to the second pin 143. A first joint part 144 and the second joint part 114 are respectively formed by a corresponding plurality of convex portions and concave portions, and thus the first joint part 144 can be crosslinked with the second joint part 114; the first signal element 140 has a first fixing part 145 between the second pin 143 and the second abutment 142, the first fixing part 145 corresponds to a first fixing slot 115 of the second receiving slot 102 in the housing 111. The first fixing part 145 is fastened to the first fixing slot 115.

The second signal element 150 is disposed in the second receiving slot 102, one end of the second signal element 150 has a second contact portion 151, and the other end of the second signal element 150 has a third pin 152, which passes through one of the corresponding the pin hole 104. Wherein the area in the second signal element 150 adjacent to the second contact portion 151 has a second fixing part 153. In fact, the second fixing part 153 is locked in a fixing slot 116 which corresponds to the second receiving slot 102 of the housing 111.

Wherein, the movable part 120 is coupled to the housing 111 and the side cover 112 by an external force and rotationally displaced toward the pin hole 104 (at the bottom of the housing 111), the two abutment slots 123 of the movable part 120 drives two first abutment 131 of the metal elastic part 130 to be displaced in the direction of the pin hole 104.

Therefore, before the movable part 120 receives external force, the first contact portion 141 of the first signal element 140 and the second contact portion 151 of the second signal element 150 are in contact with each other, and furthermore, the terminal stand 100 is disposed on a substrate 160 with the first pin 132, the second pin 143, and the third pin 152 being inserted through their corresponding the pin hole 104 before inserted into the substrate 160, thereby the first signal element 140, the second signal element 150 and the substrate 160 creates a signal loop, and before the movable part 120 rotationally displaces subjected to pressure, the first contact portion 141 and the second contact portion 151 are in contact with each other to make the signal loop turned on and is in an on-state However, when the abutment 1211 of the movable part 120 abuts the second abutment 142 and the second abutment 142 is displaced toward the passage bore 105, the second abutment 142 drives the connected first contact portion 141 to be displaced in the direction of the passage bore 105 causing the first contact portion 141 that originally touched the second contact portion 151 to leave the second contact portion 151, and the signal loop is not in contact with each other due to the first contact portion 141 and the second contact portion 151 not touching. Further, it can be known that the conducting wire has been inserted into the terminal stand 100 by the off-state of the signal loop.

The side of the housing 111 having the first opening 1011 and the second opening 1021 may have a plurality of engagement parts 107, and the side cover 112 has a plurality of engagement holes 108 corresponding to the plurality of engagement parts 107. When the side cover 112 is connected to the housing 111, each of the engagement holes 108 will be matched with the corresponding engagement part 107.

Continuing, the other side of the housing 111 may have a shaft hole 109, and the side cover 112 with another shaft hole 109, and two arms 122 correspond to the shaft hole 109 of the housing 111 and the shaft hole 109 of the side cover 112 with an axis portion 124 found in both of the above; when the movable part 120 is coupled to the base body 110, the axis portion 124 of one of the arm 122 is coupled to the shaft hole 109 of the housing 111. The axis portion 124 of the arm 122 is coupled to the shaft hole 109 of the side cover 112. Wherein, the shaft hole 109 is disposed adjacent to one end of the passage bore 105.

In addition, both sides of the housing 111 extend toward the top end to form an extending portion 113. When the pressing end 121 of the movable part 120 is not pressed, the movable part 120 will rotationally displace upward relative to the base body 110, and two arms 122 will respectively abut against corresponding an extension portion 113, and the movable part 120 stops its rotational displacement.

In practical application of the terminal stand 100 of the present invention, before the conducting wire is to be inserted into the passage bore 105, the pressing end 121 of the movable part 120 is pressed first, so that the movable part 120 rotationally displaces downward relative to the base body 110. During rotation, due to the abutment slot 123 of the inner side of two arms 122 in the movable part 120 abut against the first abutment 131 of the metal elastic part 130, the movable part 120 is rotationally displaced downward, while the abutment slot 123 presses down on the first abutment 131 which allow one end of the metal elastic part 130 to approach the other end, vacating a space above and allowing the conducting wire 200 to pass through the passage bore 105 and continue to move further into the space above.

Next, the pressing end 121 can be released, and the one end of the metal elastic part 130 that was originally pressed will be displaced upward when not pressed, and further abut against the conducting wire 200.

On the other hand, when the pressing end 121 of the movable part 120 is pressed, the abutment 1211 of the movable part 120 will abut against a portion of the second abutment 142, and the second abutment 142 is pushed into the second receiving slot 102, and since the second abutment 142 is connected to the first contact portion 141, the second abutment 142 continues moving towards the second receiving slot 102 (in the direction of channel hole 105). During the movement, the first contact portion 141 moves in the direction of the passage bore 105, so that the first contact portion 141 leaves the second contact portion 151, and the signal loop is open which determines that the conducting wire 200 has entered the first receiving slot 101.

Figure 14:
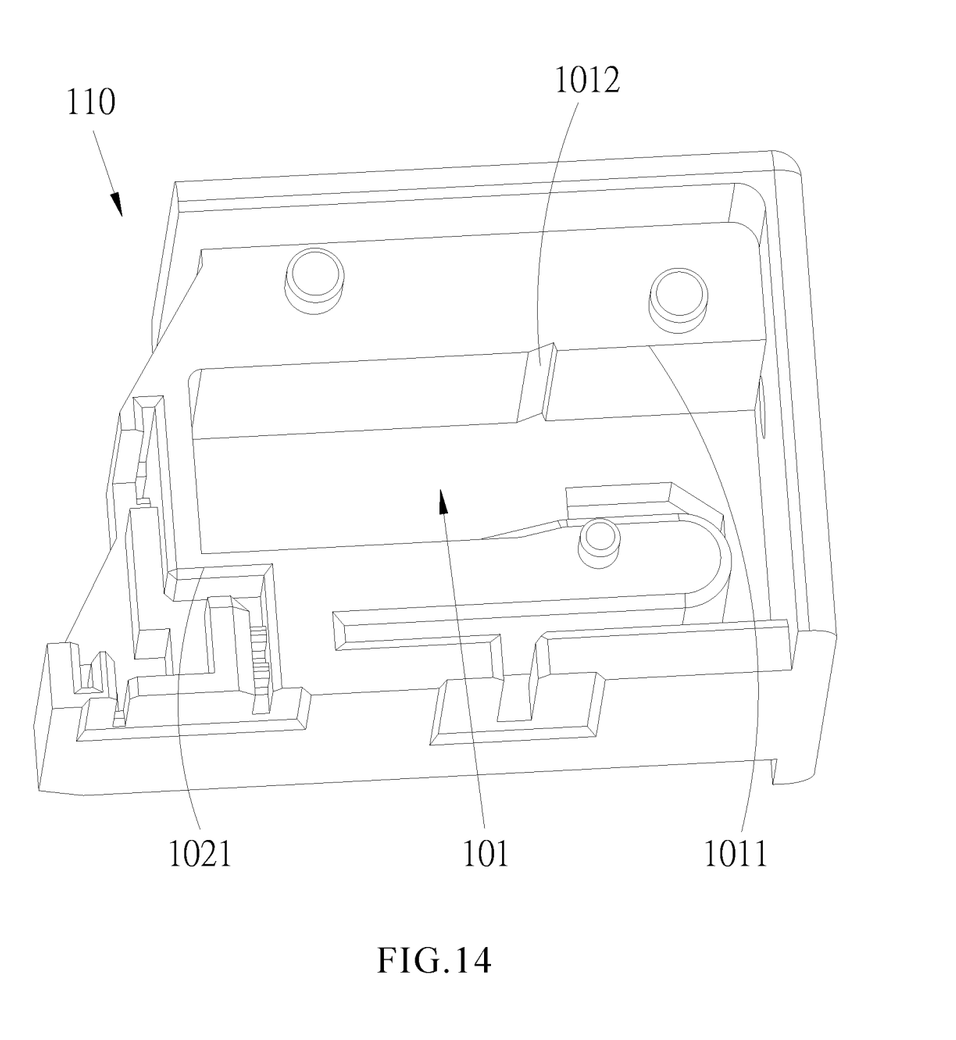
FIG. 14 is the second schematic view of the base body of the terminal stand of the present invention.

Please refer to FIG. 14, which is a second schematic diagram of the base body of the terminal stand invention. As shown, the first receiving slot 101 may have a notch 1012, a fault or a convex portion corresponding to one side of the top end of the base body 110, and the notch 1012, the gap or the convex portion may be used when the conducting wire 200 is inserted into the first receiving slot 101 and one end of the metal elastic part 130 is abutted toward the top end of the base body 110, a part of the conducting wires 200 corresponding to the notch 1012, gap or the convex portion will be bent, thereby increasing the force for the conducting wire 200 to be pulled out thus, the conducting wire 200 is less likely to be loosened or pulled out.

As described above, the terminal stand of the present invention pushes the movable part to push down the metal elastic part, so that the conducting wire enters the accommodating space from the passage bore, and then goes deeper into the space vacated after the elastic part is pressed down. After the movable part is released, the metal elastic part lifts up and clamps the conducting wire, and an abutment of the movable part abuts the second abutment of the first signal element to make the first contact portion leave the second contact portion of the second signal element to form an off-state state that indicates that the conducting wire has been inserted into the terminal stand of the terminal stand.

The embodiments described above are merely illustrative of the technical spirit and characteristics of the present invention, and the objects of the present invention can be understood by those skilled in the art and can be implemented as if the invention cannot be limited thereto. The scope of the patent, that is, the equivalent variations or modifications made by the present invention in the spirit of the invention, should still be included in the scope of the invention.

What is claimed is:

1. A terminal stand for connecting a conducting wire, the terminal stand comprises:
   a base body including:
      a housing with a first receiving slot and a second receiving slot, a first opening is formed on a side of the housing and at the first receiving slot, and a second opening is formed on the side of the housing and at the second receiving slot, and a third opening is formed at an end of the housing, another side of the housing has a first through hole, the bottom surface of the housing has three pin holes, and the other end of the housing has a passage bore used for being passed through by the conducting wire, the passage bore is in communicated with the first receiving slot;
      a side cover connected to the side of the housing and the first opening and the second opening are covered by the side cover, the side cover has a second through hole corresponding to the first through hole;
      a movable part, an end thereof is a pressing end, an inner side of the pressing end has an abutment, and the other end of the movable part is extended and formed to be two arms, one of the arms is coupled to the other side of the housing with the first through hole, the other arm is coupled to the side cover, and an abutment slot is formed respectively corresponding to the first through hole and the second through hole on the inner side of the two arms;
      a metal elastic part disposed in the first receiving slot, and an end of the metal elastic part has two first abutments, one of the first abutments passes through the first through hole and abuts against one of the abutment slots, the other first abutment passes through the second through hole and abuts against the other abutment slot, and another end of the metal elastic part has a first pin, and the first pin passes through one of the pin holes correspondingly;
      a first signal element disposed in the second receiving slot, an end of the first signal element has a first contact portion, a second abutment of the first signal element adjacent to the first contact portion partially protrudes beyond the third opening, and another end of the first signal element has a second pin passing through one of the pin holes correspondingly; and
      a second signal element disposed in the second receiving slot, an end of the second signal element has a second contact portion, and another end of the second signal element has a third pin, the third pin passes through one of the pin holes correspondingly;
   wherein, when the movable part is rotationally displaced in the direction of the pin hole by an external force, the two abutment slots drive the two first abutments of the metal elastic part to be displaced in the direction of the pin hole, and the first contact portion contacts the second contact portion in order to form a signal loop at on-state, when the abutment abuts the second abutment portion and the second abutment portion is displaced toward the passage bore, the first contact portion is driven away from the second contact portion by the second contact portion, and the signal loop is in an off-state state.

2. The terminal stand according to claim 1, wherein the side of the housing has a plurality of engagement portions, and the side cover has a plurality of engagement holes corresponding to the plurality of engagement portions.

3. The terminal stand according to claim 1, wherein the other side of the housing has a shaft hole, and the side cover has an another shaft hole, and the two arms respectively have a coupling portion corresponding to the two shaft holes.

4. The terminal stand according to claim 3, wherein two sides of the housing near a top of the housing are respectively extended to form an extension portion, and the two arms are respectively abutted against the extension portion correspondingly.

5. The terminal stand according to claim 1, wherein the terminal stand is disposed on a substrate, and the first pin, the second pin and the third pin are inserted onto the substrate.

6. The terminal stand according to claim 1, wherein the first receiving slot has a notch, a gap or a convex portion on a side of the top end of the base body correspondingly.

* * * * *